(12) United States Patent
Brown et al.

(10) Patent No.: US 7,107,318 B2
(45) Date of Patent: Sep. 12, 2006

(54) METHOD AND APPARATUS TO REACTIVATE TCP CONNECTION WITH SLEEPING PEERS

(75) Inventors: Deanna Lynn Quigg Brown, Pflugerville, TX (US); Lilian Sylvia Fernandes, Austin, TX (US); Vinit Jain, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/682,395

(22) Filed: Oct. 9, 2003

(65) Prior Publication Data

US 2005/0091331 A1 Apr. 28, 2005

(51) Int. Cl.
*G06F 15/16* (2006.01)
(52) U.S. Cl. .................. 709/208; 709/217; 709/228
(58) Field of Classification Search ........ 709/200–203, 709/208–210, 217–229
See application file for complete search history.

(56) References Cited

U.S. PATENT DOCUMENTS

| | | | |
|---|---|---|---|
| 5,983,353 A | 11/1999 | McHann, Jr. ............... | 713/310 |
| 6,101,608 A | 8/2000 | Schmidt et al. ............. | 713/202 |
| 6,493,824 B1 | 12/2002 | Novoa et al. ............... | 713/162 |
| 6,505,058 B1* | 1/2003 | Willey ......................... | 455/574 |
| 6,526,507 B1 | 2/2003 | Cromer et al. .............. | 713/162 |
| 2003/0190937 A1* | 10/2003 | Karmi et al. ............... | 455/574 |
| 2005/0144318 A1* | 6/2005 | Chang ......................... | 709/245 |

OTHER PUBLICATIONS

Magic Packet Technology, Nov. 1995, pp. 1-6.

* cited by examiner

*Primary Examiner*—Moustafa M. Meky
(74) *Attorney, Agent, or Firm*—Duke W. Yee; Marilyn Smith Dawkins

(57) ABSTRACT

A method, apparatus, and computer instructions for reactivating an existing connection to a remote data processing system. A data packet is created using a previously acknowledged sequence number for the connection. The sequence number is used to uniquely number data bytes sent in a connection, such as a TCP connection. With this sequence number, devices and components, such as routers and fire walls will forward the packet to the destination. A special data sequence, such as a MAC address of the remote data processing system repeated a selected number of times, is placed in the data packet. This special data sequence causes the remote data processing system to wake up from a sleep mode when received by the remote data processing system. The data packet is sent to the remote data processing system using the existing connection. The use of a subnet directed broadcast is avoided. Thus, problems associated with routing wake up packets are avoided.

19 Claims, 3 Drawing Sheets

METHOD AND APPARATUS TO REACTIVATE TCP CONNECTION WITH SLEEPING PEERS

BACKGROUND OF THE INVENTION

1. Technical Field

The present invention relates generally to an improved data processing system, and in particular, to a method and apparatus for managing a data processing system. Still more particularly, the present invention relates to a method, apparatus, and computer instructions for reactivating TCP connections.

2. Description of Related Art

In network data processing systems, remote wake up abilities are often provided for client systems. This type of feature allows a client to be turned on through the network. With this feature, a system administrator or other user may wake up a sleeping client by sending a network packet to that client. A data processing system is in a sleep mode when the data processing system is powered off, but power is present for the network adapter. The data processing system may be off or in some power conservation mode when in a sleep state. When the adapter has a wake up feature enabled, the adapter is able to wake up or power up the data processing system when an appropriate wake up packet is received.

For example, with a network adapter, such as an Ethernet controller, the adapter is modified to listen for a special wake up on local area network (LAN) address even when the computer in which the network adapter is located is asleep in a power conservation mode. Upon receiving this packet, the network adapter checks the packet content to ensure the packet is destined for this particular client. If the packet is destined for the client and contains a well-known "magic packet" sequence, the adapter wakes up the sleeping client.

This type of feature may be used on a large network data processing system in which the administrator's data processing system is located on a different subnet from the clients that are being managed. In this case, the "wake up" packet is sent to a subnet-directed broadcast IP address for the destination network. This packet may be forwarded by routers along the way to the client from a system administrator's data processing system.

A "wake up" packet or magic packet, is a specially formatted packet sent over the network that includes data recognized by an adapter that causes the adapter to wake up the data processing system. A magic packet is a particular type of wake up network packet. A magic packet is a packet containing information, such as the media access control (MAC) address, which is a unique hardware number identifying the target. In the depicted examples, the magic packet contains the MAC address, repeated 16 times. This packet is sent using a subnet-directed broadcast and not through a connection between systems. This wake up system allows an initially powered-off client computer system on the network to be powered up. This mechanism is also referred to as a "wake-on-LAN" process.

In some cases, a connection between two host computers may result in one host going into a sleep or power conservation mode, such as, for example, a Transmission Control Protocol (TCP) connection between a laptop computer running on battery power and a server computer. The laptop may shift into a sleep mode if battery power is running low or if a certain amount of time passes without a selected activity occurring. As a result, the other end of the connection may time out after a certain interval and close the TCP connection.

A wake up packet sent to the sleeping machine's subnet-directed broadcast address could be used at this point. Currently, however, routers or firewalls may not forward the magic packet to a sleeping data processing system. This situation occurs because routers do not forward subnet-directed broadcasts, which is the mechanism used to send a magic packet. Also, firewalls may block these types of packets from reaching the destination subnet.

Therefore, it would be advantageous to have an improved method, apparatus, and computer instructions for waking up data processing systems in a sleep mode.

SUMMARY OF THE INVENTION

The present invention provides a method, apparatus, and computer instructions for reactivating an existing connection to a remote data processing system. A data packet is created using a previously acknowledged sequence number for the connection. The sequence number is used to uniquely number data bytes sent in a connection, such as a TCP connection. With this sequence number, devices and components, such as routers and fire walls will forward the packet to the destination. A special data sequence, such as a MAC address of the remote data processing system repeated a selected number of times, is placed in the data packet. This special data sequence causes the remote data processing system to wake up from a sleep mode when received by the remote data processing system. The data packet is sent to the remote data processing system using the existing connection. The use of a subnet directed broadcast is avoided. Thus, problems associated with routing wake up packets are avoided.

BRIEF DESCRIPTION OF THE DRAWINGS

The novel features believed characteristic of the invention are set forth in the appended claims. The invention itself, however, as well as a preferred mode of use, and further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
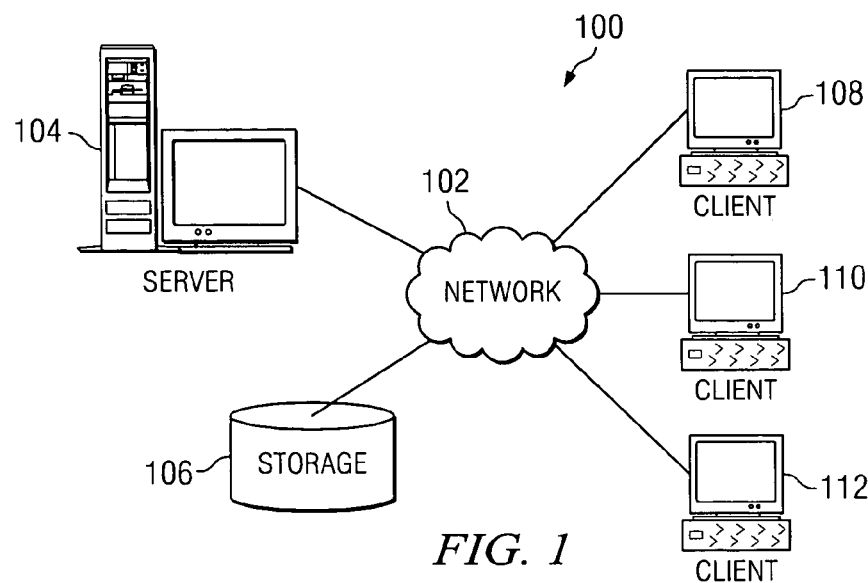
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
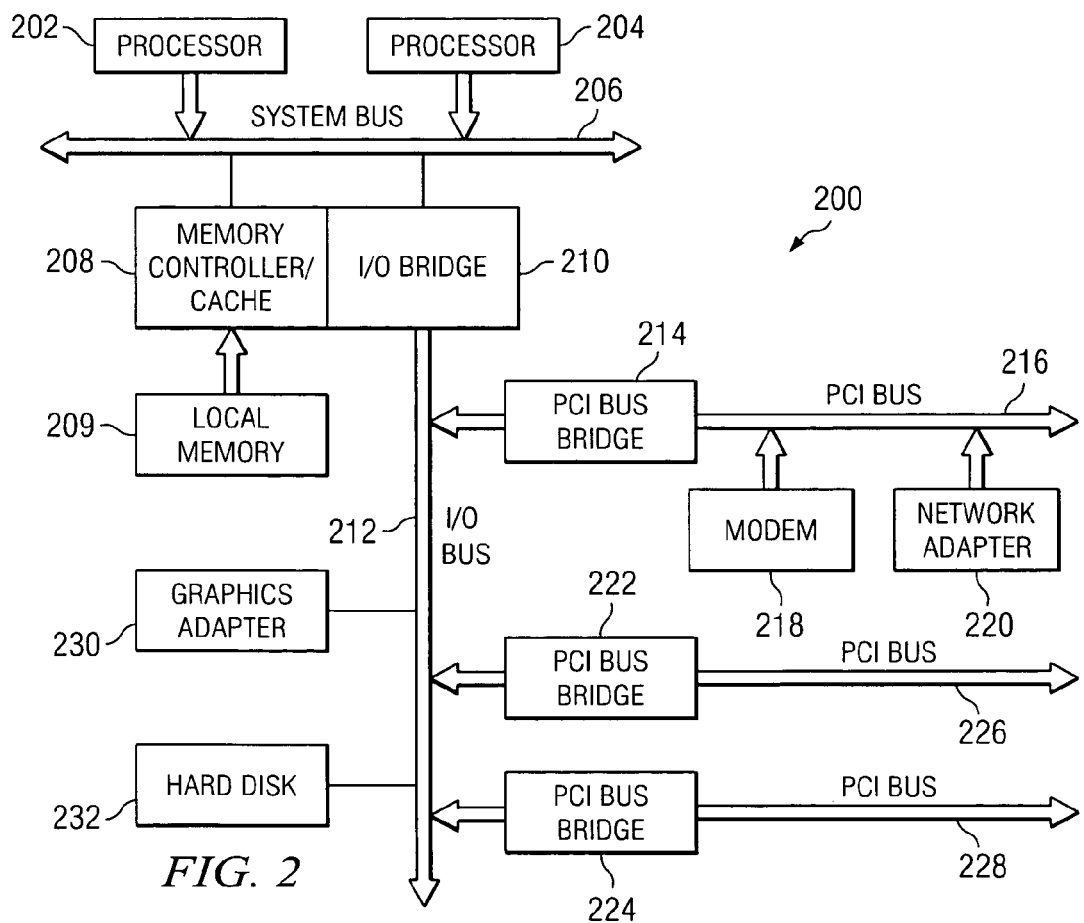
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
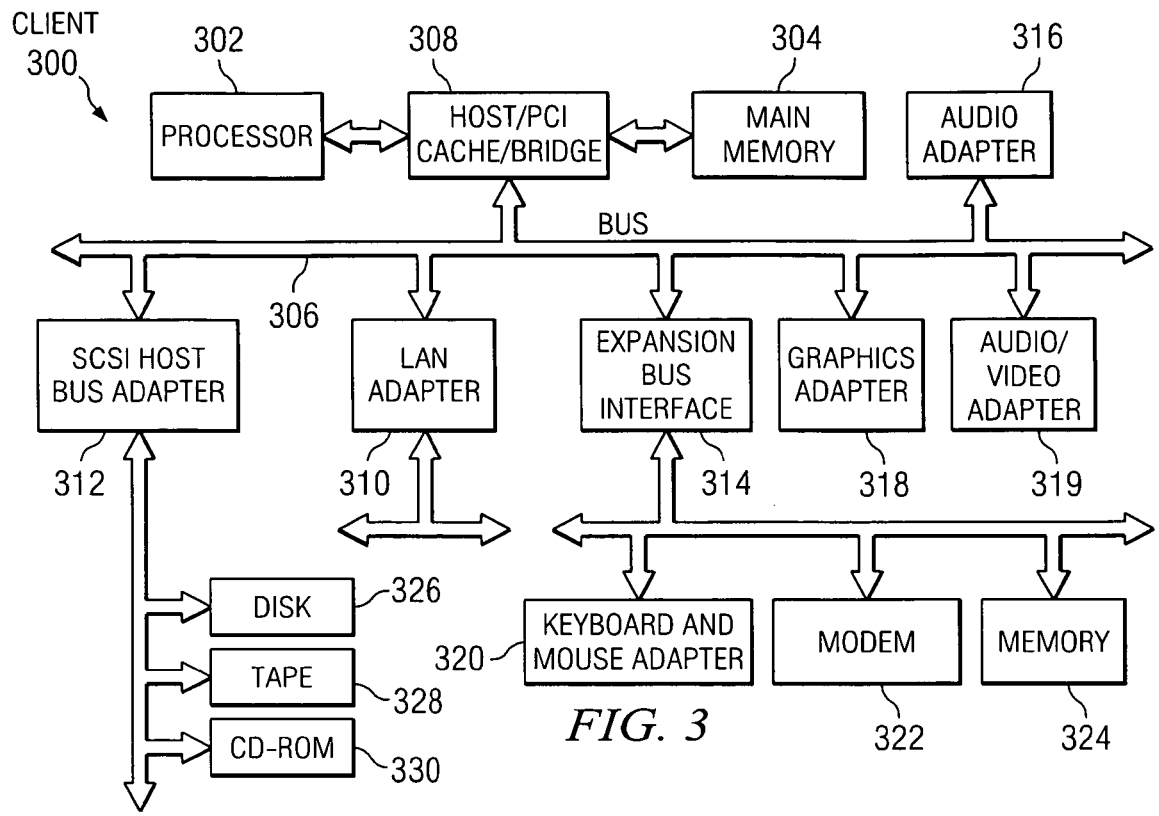
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Present invention provides a method, apparatus, and computer instructions for waking a sleeping peer or host through an existing connection. The mechanism of the present invention creates a TCP packet using a previously acknowledged sequence number. Sequence numbers are used to uniquely number data bytes being sent in a TCP connection. These sequence numbers are managed by the TCP protocol and are part of the TCP protocol header. When this data reaches the other side, the peer or remote host, an acknowledgement is sent back that references the data byte sequence numbers. For example, if sequence numbers 1000 trough 4000 is sent and an acknowledgement for 2000 is received, this result means that sequence numbers 1000 through 1999 have reached the other end. When sending the wakeup packet using the mechanism of the present invention, a sequence number 'x' such that x and (x_+size of magic data) falling between 1000–1999 range is used for the sequence number. This packet is sent to the sleeping remote host to cause the remote host to be woken up.

Figure 4:
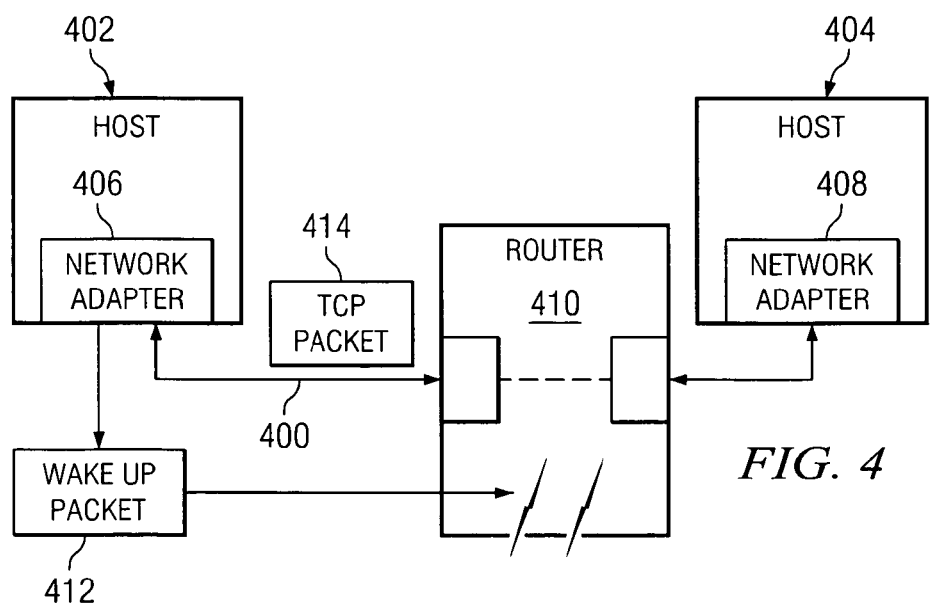
FIG. 4 is a diagram illustrating components used in reactivating TCP connections with sleeping peers in accordance with a preferred embodiment of the present invention.

Turning now to FIG. 4, a diagram illustrating components used in reactivating TCP connections with sleeping peers is depicted in accordance with a preferred embodiment of the present invention. In this example, TCP connection 400 is open between data processing system 402 and data processing system 404. These data processing systems may be implemented using data processing system 300 in FIG. 3. During the initial negotiation of TCP connection 400 between data processing system 402 and data processing system 404, these two data processing systems exchange MAC addresses for use in a wake up packet.

Data processing system 402 includes network adapter 406, and data processing system 404 includes network adapter 408. Each of these adapters provide for a wakeup feature in which the data processing system may be woken up through the use of a particular type of network packet. Router 410 is used to direct data between data processing system 402 and data processing system 404 through TCP connection 400.

In this example, data processing system 404 goes or shifts into a sleep mode. Data processing system 402 detects this change after some period of time. Data processing system 402 may send wake up packet 412 to data processing system 404. In these examples, the packet is a subnet-directed broadcast wake up packet. In this case, router 410 may refuse to forward wake up packet 412. Additionally, a firewall implemented in router 410 or elsewhere along TCP connection 400 may refuse to allow wake up packet 412 to reach data processing system 404 even though the TCP connection has been established.

In this case, data processing system 402 may wake up data processing system 404 by sending TCP packet 414 through TCP connection 400. Router 410 will forward the packet because it is no longer addressed to a subnet-directed broadcast address. The firewall will allow this packet to be forwarded and received by data processing system 404 in this example, because this packet is part of an existing TCP connection. Upon receiving TCP packet 414, network adapter 408 will wake up data processing system 404 and pass the TCP packet up to the TCP protocol stack on 404. The TCP protocol stack will discard the packet because of the old sequence number. Thus, data processing system 404 will have been woken up.

In these examples, TCP packet 414 has a payload that contains a magic packet data sequence used to wake up data processing system 404. If either data processing system does not understand or implement the mechanism of the present invention, the current TCP behavior is used, rather than that of the present invention.

Figure 5:
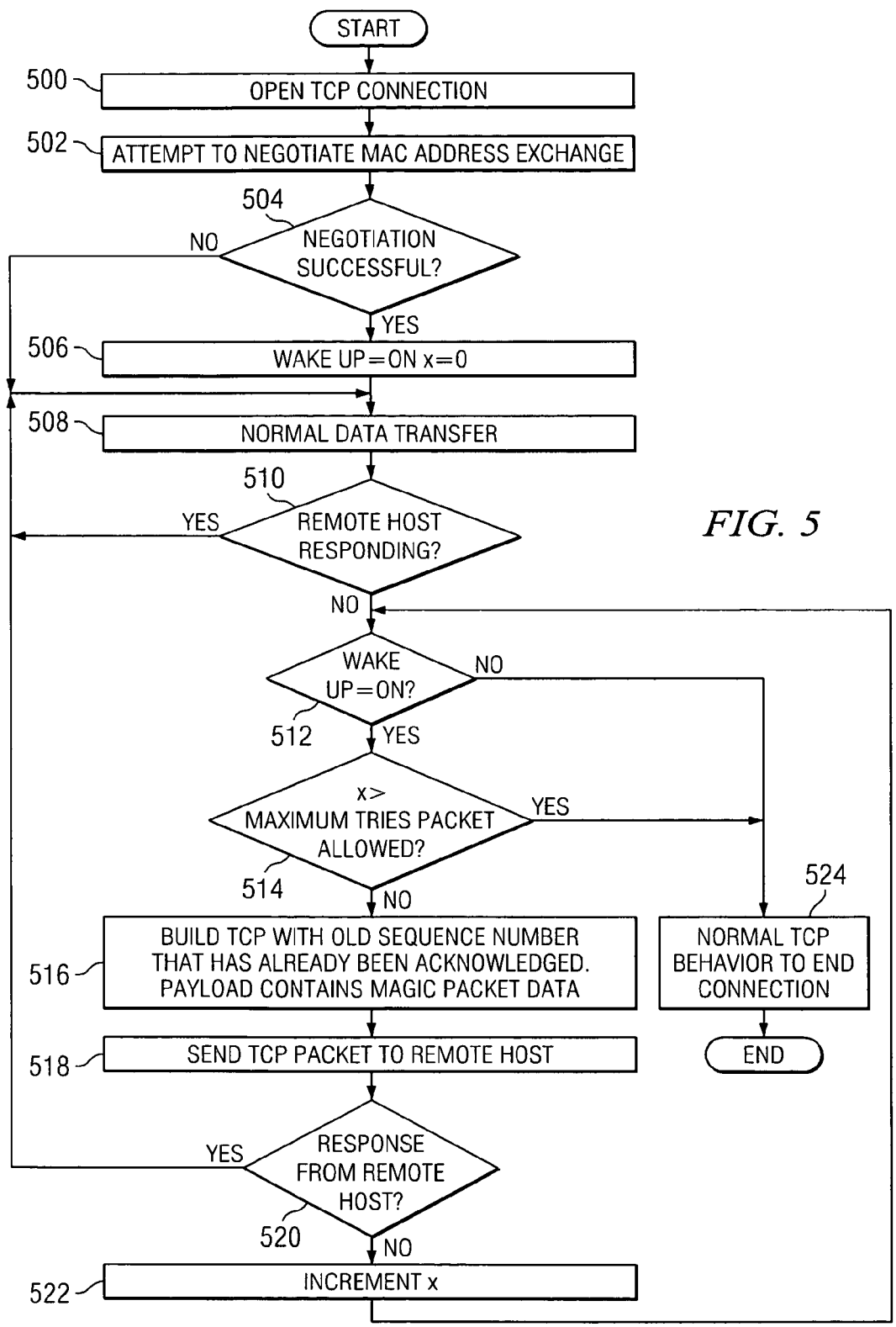
FIG. 5 is a flowchart of a process for waking up a remote host in accordance with a preferred embodiment of the present invention.

Turning now to FIG. 5, a flowchart of a process for waking up a remote host is depicted in accordance with a preferred embodiment of the present invention. The process illustrated in FIG. 5 may be implemented in a data processing system, such as data processing system 402 in FIG. 4.

The process begins by opening a TCP connection (step 500). Thereafter, negotiation of a MAC address exchange is attempted (step 502). This step is performed because MAC addresses are a necessary part of wakeup packets. Once MAC addresses are exchanged, both hosts would have all the necessary information to construct the wakeup packet special data sequence. In the depicted example, this sequence is the MAC address, repeated 16 times.

A determination is made as to whether the negotiation was successful (step 504). If the negotiation is successful, then the wake up feature is set equal to "on" and a value for a variable "x" is set equal to zero (step 506). Normal data transfer then occurs (step 508). If the negotiation process is not successful, the process sends data in step 508 without setting the wake up feature to "on" or setting the value of "x" equal to zero. In these examples, the variable "x" is used as a counter.

Next, a determination is made as to whether the remote host responds to the data transfer (step 510). If a response occurs, the process returns to step 508 to continue normal sending of data. If a response is not received from the sending of data, a determination is made as to whether the wake up feature has been set equal to "on" (step 512). If the wake up feature is set to "on", a determination is made as to whether the value of "x" is greater than the maximum number of tries allowed (step 514). If "x" is not greater than the maximum number of tries allowed, a TCP packet is built with an old sequence number that has been previously acknowledged and a payload that contains magic packet data (step 516). Thereafter, the TCP packet is sent to the remote host (step 518). A determination is made as to whether a response from the remote host is received (possibly after waiting for some period of time) (step 520). If a response is not received, the value of "x" is incremented by one (step 522). Thereafter, the process returns to step 512 as described above. On the other hand, if a response is received, then the remote host has been woken up and the process returns to step 508 to resume normal data transfer.

With reference again to step 514, if the maximum number of tries allowed has been exceeded by the value of "x", the process ends the TCP connection between the two hosts (step 524) with the process terminating thereafter. The process also proceeds to step 524 from step 512 if the wake up feature has not been set to "on".

Thus, the present invention provides an improved method, apparatus, and computer instructions for waking up remote hosts. The mechanism of the present invention uses a TCP packet that is part of an already existing connection. In this manner, the TCP packet is passed through all routers and firewalls. The TCP packet uses a sequence number that has already been acknowledged by the remote host. In this manner, the TCP packet will be delivered by the router and firewalls to the remote host. In these examples, the payload of this TCP packet contains a sequence of bytes and other information to wake up the remote host. Delivery of this packet to the network adapter on the sleeping remote host causes the remote host to wake up from the sleep mode.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for waking a remote data processing system, wherein an existing connection is present between the data processing system and remote data processing system, the method comprising:
   creating a data packet using a previously acknowledged sequence number for the existing connection, wherein the previously acknowledged sequence number was returned as an acknowledgement of data previously sent to the remote data processing system;
   placing wake up data in the data packet, wherein the wake up data causes the remote data processing system to wake up from a sleep mode when received by the remote data processing system; and
   sending the data packet, including the previously acknowledged sequence number and the wake up data, to the remote data processing system using the existing connection.

2. The method of claim 1, wherein the existing connection is a transmission control protocol connection.

3. The method of claim 1 further comprising:
   responsive to receiving an acknowledgement of the data packet from the remote data processing system, transmitting data to the remote data processing system.

4. The method of claim 1, wherein the creating step is initiated in response to a time-out occurring with respect to data transmission with the remote data processing system.

5. The method of claim 1, wherein the wake up data includes a media access control address of the remote data processing system.

6. The method of claim 1, wherein the wake up data includes a MAC address for the remote data processing system and further comprising: exchanging MAC addresses between the data processing system and the remote data processing system when establishing the existing connection.

7. A data processing system for waking a remote data processing system, wherein an existing connection is present between the data processing system and remote data processing system, the data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to create a data packet using a previously acknowledged sequence number for an existing connection, wherein the previously acknowledged sequence number was returned as an acknowledgement of data previously sent to the remote data processing system; place wake up data in the data packet in which the wake up data causes the remote data processing system to wake up from a sleep mode when received by the remote data processing system; and send the data packet, including the previously acknowledged sequence number and the wake up data, to the remote data processing system using the existing connection.

8. A data processing system for waking a remote data processing system, wherein an existing connection is present between the data processing system and the remote data processing system, the data processing system comprising:
   creating means for creating a data packet using a previously acknowledged sequence number for the existing connection, wherein the previously acknowledged sequence number was returned as an acknowledgement of data previously sent to the remote data processing system;
   placing means for placing wake up data in the data packet, wherein the wake up data causes the remote data processing system to wake up from a sleep mode when received by the remote data processing system; and
   sending means for sending the data packet, including the previously acknowledged sequence number and the wake up data, to the remote data processing system using the existing connection.

9. The data processing system of claim 8, wherein the existing connection is a transmission control protocol connection.

10. The data processing system of claim 8 further comprising:
    transmitting means, responsive to receiving an acknowledgement of the data packet from the remote data processing system, for transmitting data to the remote data processing system.

11. The data processing system of claim 8, wherein the creating means is initiated in response to a time-out occurring with respect to data transmission with the remote data processing system.

12. The data processing system of claim 8, wherein the wake up data includes a media access control address of the remote data processing system.

13. The data processing system of claim 8, wherein the wake up data includes a MAC address for the remote data processing system and further comprising: exchanging MAC addresses between the data processing system and the remote data processing system when establishing the existing connection.

14. A computer program product in a computer readable medium for waking a remote data processing system, wherein an existing connection to the remote data processing system is present, the computer program product comprising:
    first instructions for creating a data packet using a previously acknowledged sequence number for the existing connection, wherein the previously acknowledged sequence number was returned as an acknowledgement of data previously sent to the remote data processing system;
    second instructions for placing wake up data in the data packet, wherein the wake up data causes the remote data processing system to wake up from a sleep mode when received by the remote data processing system; and third instructions for sending the data packet, including the previously acknowledged sequence number and the wake up data, to the remote data processing system using the existing connection.

15. The computer program product of claim 14, wherein the existing connection is a transmission control protocol connection.

16. The computer program product of claim 14 further comprising:

fourth instructions, responsive to receiving an acknowledgement of the data packet from the remote data processing system, for transmitting data to the remote data processing system.

17. The computer program product of claim 14, wherein the creating step is initiated in response to a time-out occurring with respect to data transmission with the remote data processing system.

18. The computer program product of claim 14, wherein the wake up data include a media access control address of the remote data processing system.

19. The computer program product of claim 14, wherein the wake up data includes a MAC address for the remote data processing system and further comprising: exchanging MAC addresses between the data processing system and the remote data processing system when establishing the existing connection.

* * * * *